United States Patent Office 3,355,329
Patented Nov. 28, 1967

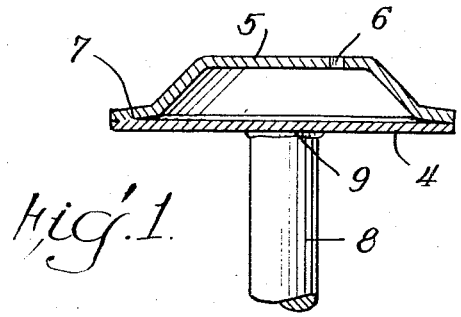
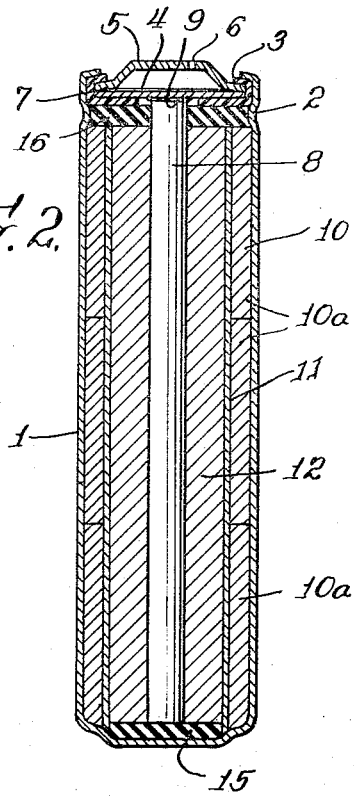
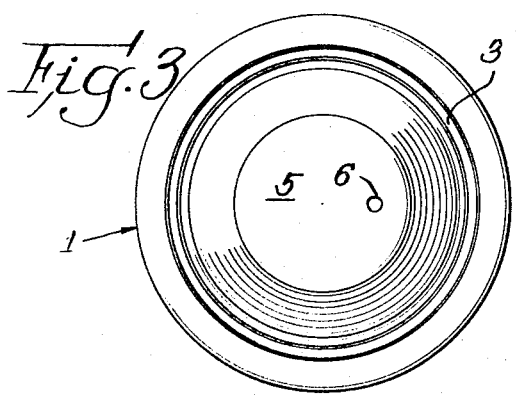
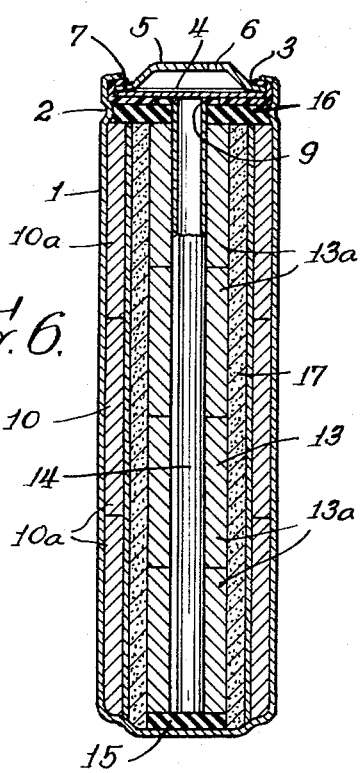
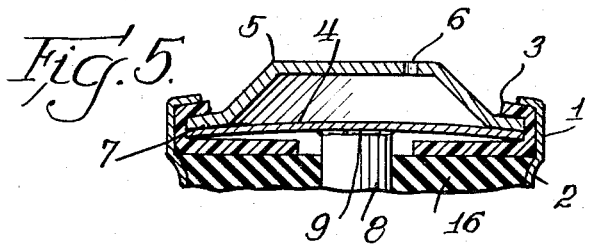

3,355,329
CELL HAVING INTEGRAL VALVE, TERMINAL, AND CONTACT MEMBER ASSEMBLY
Milton E. Wilke and William R. Brooks, Freeport, Ill., assignors to Clevite Corporation, a corporation of Ohio
Filed Feb. 28, 1966, Ser. No. 530,587
10 Claims. (Cl. 136—134)

The present invention relates to voltaic cells having means for venting fluids such as gases, and more particularly relates to a voltaic cell having an integral assembly comprising a diaphragm valve for venting gases, an external terminal member, and an internal contact member adapted to provide electrical contact with an axially arranged anode member.

Although the invention is applicable to all types of voltaic cells, it is especially suitable for use in the construction of containers for cells utilizing alkaline electrolyte, where gas formation resulting in excessive internal pressures is frequently encountered.

Various types of alkaline cells are currently in widespread use. The characteristics common to all is that they utilize an electrolyte comprised of an aqueous solution of an alkali metal hydroxide, as for example, potassium hydroxide. The alkaline cells may be further categorized as either primary cells or secondary cells. The primary alkaline cell most commonly used has a zinc anode, preferably in the form of amalgamated zinc powder, and a cathode or depolarizer member of a readily reducible metallic oxide such as manganese dioxide or mercuric oxide.

The most common of the secondary cells is the so-called nickel-cadmium cell. This cell utilizes an anode comprised of powdered cadmium metal and a cathode comprised of an oxide of nickel. Still another commercial alkaline cell utilizes amalgamated zinc powder as the anode and silver oxide as the cathode.

Alkaline cells have enjoyed wide public acceptance for a number of reasons. The primary alkaline cell offers a discharge capacity as much as three or four times as great as that of traditional dry cells of comparable size. The secondary cell offers the prime advantage that, since the reactions which take place during discharge and recharge so nearly approach reversibility, the cells may be charged and discharged through a large number of cycles before they are rendered unusable. Both primary and secondary alkaline cells have a low uniform internal impedance during discharge, and consequently the voltage under current drain remains almost constant until the cell is exhausted. An additional advantage enjoyed by both types is that high discharge rates may be used without causing harm to the cell.

In order to be suitable for general commercial use, alkaline cells, both primary and secondary, must be provided with air-tight or hermetically sealed containers. There are several reasons for this requirement. First, the cells are often used in expensive electronic equipment, where any leakage of the cell electrolyte must be prevented. Second, the cells must be sealed from the atmosphere, since carbon dioxide normally present in the atmosphere would react with the alkaline electrolyte to produce carbonates, exhausting the electrolyte and reducing the useful life of the cell.

During certain phases of the normal operation of an alkaline cell, gases may develop therein. In the primary cell, gases may develop during the latter part of the discharge period, especially if the cells are over-discharged. Gases may also form during normal discharge if the discharge rate is excessive. In the secondary cell, gases may be formed during excessively high discharge or over-discharge. In addition, gases are normally generated during the latter part of the charge cycle and during over-charge. Although excessive over-charge is undesirable, a certain amount must be tolerated by the cell since it is generally not practical to determine the exact point of full charge and to stop the charging process exactly at that point.

Numerous venting means for hermetically sealed or air-tight cells have been disclosed in the prior art. In one type a closed crack or split is provided in the wall of the cell container, permitting the crack or split to rupture when the gas pressure becomes excessive. In another the cell wall is weakened at a point, enabling it to rupture at a predetermined gas pressure. In most cases, the means disclosed for venting gases may be characterized as emergency expedients and not adaptable for venting gases under normal continued use. Even where in some instances prior art means for venting gas under normal operating conditions have been disclosed, the means have not been susceptible of the necessary precision in pre-determining the venting pressure.

In U.S. Patent 3,143,441 a novel diaphragm valve for venting fluid from a cell is disclosed, comprising a plurality of individual parts including a resilient metal diaphragm valve, an inverted cup-form terminal cap in contact with the periphery of one side of the valve, a conical contact disc engaging the periphery of the other surface of the disc, and a rod-like contact member adapted to engage the centrally located anode of the cell and its upper end engaging the apex of the contact disc. This arrangement has been found to operate very well indeed, providing a sealed external electrode while still permitting gases to be precisely vented from the cell at a predetermined pressure. However, because the valve assembly comprises four individual parts which must be individually inserted, the assembly is rather tedious and doesn't lend itself well to automatic machine assembly.

It is an object of the invention to provide a valve for the controlled relief venting of fluids from a voltaic cell at a pressure which may be predetermined within precise limits.

It is further an object to provide a gas venting means for a voltaic cell enclosure which is relatively inexpensive and simple to construct.

It is further an object to provide a hermetically sealed voltaic cell enclosure having means for venting gases which have accumulated to form an abnormally high pressure, and wherein the sealed state is restored after sufficient gas has been vented to the atmosphere to reduce the internal cell pressure to a value below that of the venting pressure.

It is an additional object to provide a structure of the type described which facilitates the assembly of the cell and which is so arranged as to render the assembly of the cell adaptable to mass production assembly by means of automatic machinery.

It is still further an object to provide such a structure which provides reliable electrical contact from the internal anode to a terminal external of the cell.

Other objects and advantages of the invention will become more apparent from the following description when taken in conjunction with the accompanying drawings in which:

FIG. 1 is a cross-section of a diaphragm valve-terminal assembly according to the invention.

FIG. 2 is a vertical cross-sectional view of a voltaic cell incorporating the valve structure.

FIG. 3 is a plan view of the top of the cell.

FIG. 4 is an enlarged fragmentary cross-sectional view of the top of the cell showing the fluid venting valve structure of the invention in normal position.

FIG. 5 is an enlarged fragmentary cross-sectional view of the top of the cell showing the fluid venting valve structure in venting position; and FIG. 6 is a vertical cross-sectional view of a voltaic cell in an alternative embodiment of the invention.

According to the invention, an integral assembly is preformed comprising an outer terminal member, a disc-form diaphragm valve, and an elongate internal contact member. One end of the contact member is affixed to the diaphragm valve, preferably at its center, by suitable means such as welding or soldering. Additionally, a limited portion of the periphery of the diaphragm valve is affixed to the periphery of the outer terminal member by suitable means such as spot welding. During assembly of the cell, the entire preformed integral assembly is inserted into the cell container as a unit, thereby greatly facilitating assembly of the cell.

Referring to FIGS. 1-5 of the drawings, the cell container is comprised of a steel cylindrical can 1 having a circular bead 2 provided near one end for supporting the closure structure. Above the bead is contained a sealing gasket 3 in the form of a flanged washer composed of a material such as nylon or neoprene.

The sealing gasket retains the integral terminal-diaphragm valve assembly of the invention. As shown more clearly in FIG. 1, the assembly comprises a resilient valve diaphragm 4 of a material such as spring steel, a rigid metallic terminal cap 5 having a venting aperture 6 at its upper surface. The terminal cap 5 is comprised of a substantially rigid material such as sheet steel. The periphery of the cap 5 is in contact engagement with the periphery of the diaphragm 4 and is affixed to the periphery of the diaphragm at a limited area by means of a spot weld 7. The diameter of diaphragm 4 may be slightly greater than that of cap 5. A contact member 8 is affixed to the center of the diaphragm valve 4 by means of a spot weld 9. The central portion of the cap 5 is domed externally away from the diaphragm 4 to permit the central portion of the diphragm to bow into the space therebetween without resistance. The sealing gasket 3 is compressed radially between the edge of the diaphragm and the adjacent portion of the wall of the steel can. Positioned in close electrical contact with the can 1 is a cylindrical depolarizer cathode 10. To promote ease of assembly, the cathode 10 is formed from a plurality of separately molded sleeve segments 10a which are individually inserted into the can.

A thin barrier member or membrane 11 of an ion-permeable material such as parchment is positioned at the inner surface of the tubular cathode to prevent the cathode material from migrating to the interior portion of the cell.

The centrally located anode 12 may be in the form of a slurry of alpha cellulose, electrolyte, and powdered amalgamated zinc, as disclosed in U.S. Patent 3,056,849. Alternatively, the anode may be in the form of a gel comprised of carboxymethylcellulose, electrolyte, and amalgamated zinc powder. The contact member 8 is immersed in the anode material and provides electrical contact between the anode and the external cap 5. The contact member may be of any convenient form such as tubular or cylindrical, and is preferably composed of a material such as steel.

In the alternative embodiment shown in FIG. 6, the anode 13 is comprised of powdered metal molded under pressure in the form of short tubes 13a. A plurality of the tubes are inserted into the central portion of the cell.

In order to provide good electrical contact between the segments of the anode, and the external terminal of the cell, a contact spring member 14 is inserted inside the anode. In the form shown, the contact spring member is a split tube commonly termed a "roll pin." In order to provide good contact, the outer diameter of the roll pin should be slightly larger than the inner diameter of the anode, so that a constant outward radial force is exerted by the roll pin against the anode. An insulating disc 15 preferably of a resilient material such as neoprene insulates the roll pin or contact member from the bottom of the can 1 in both embodiments. Also, a second insulating disc 16 separates the cell elements from the closure structure.

The material used for forming the cathode may be any one of the easily reducible metal oxides commonly used in the battery art, such as manganese dioxide, mercuric oxide, silver oxide, copper oxide or an oxide of nickel. When relatively non-conductive materials are used, as for example manganese dioxide or mercuric oxide, a minor proportion of a conductive material such as graphite or a carbon black such as acetylene black must be added in order to increase the conductivity of the depolarizing mixture. Silver oxide is generally in itself sufficiently conductive so that additional conductive materials need not be added. Suitable depolarizer compositions may be prepared by mixing together about nine parts manganese dioxide and about one part finely divided graphite, or about ten parts mercuric oxide and one part graphite. In the case of the nickel-cadmium cell, powdered metallic nickel may be added to the oxide in order to increase conductivity. The depolarizer mixture is preferably molded under pressure to the desired form. Where a tubular cathode is to be utilized, it has been found convenient to mold the cathode in the form of a plurality of tubes which are individually inserted, as shown in the drawing. The outer diameter of the depolarizer tubes should be so chosen that a tight press fit will result when they are inserted into the can 1, so that good electrical contact between the cathode and the can will result.

The function of the barrier member 11 is to prevent depolarizer particles from migrating to the central portion of the cell and thereby causing a short circuit. It must be composed of a material which is sufficiently resistant to the electrolyte so that it will not be decomposed, and yet must be sufficiently permeable so that the electrolyte may pass freely therethrough. Suitable barrier materials are parchment paper, sodium carboxymethylcellulose, porous polymeric films of a material such as vinyl chloride, and other suitable barrier materials which are known to the art.

A bibulous separator 17 which may be composed of any electrolyte-absorbent material which is not adversely affected by the electrolyte is positioned between the barrier member 11 and the anode 13 of the cell shown in FIG. 6. A suitable material is webril, a non-woven fabric made by blending thermoplastic fibers into a cotton web and applying heat and pressure. The separator retains the major proporation of the electrolyte.

The electrolyte may be chosen from among any of those suitable for the particular electrochemical system used. A preferred alkaline electrolyte has the following composition:

| | Percent |
|---|---|
| KOH | 28 |
| ZnO | 6 |
| $H_2O$ | 66 |

The zinc oxide component is utilized only where the anode is comprised of zinc. Its function is that of an inhibiting agent to protect the zinc anode from excessive dissolution in the electrolyte, especially during the period when no current is being drawn from the cell.

The anode is composed of an electronegative metal. In the mercury, manganese dioxide, and silver cells, zinc is the preferred anodic metal. The anode of FIG. 6 may be fabricated by placing the metal in the form of amalgamated powder into molds of a desired size and shape, and molding the structure under pressure. In the case of a nickel-cadmium cell, the anode is comprised of powdered cadmium or, alternatively, cadmium oxide, when the cell is assembled in the discharged state. When a gel or slurry type of anode is used, the composition is prepared by mixing together the ingredients.

One of several methods may be used for assembling the cell shown in the drawing. In one method the end of the can is first flared outwardly to form a flange so that the end portion has a diameter somewhat greater than that of the remaining portion of the can. The cathode material is inserted into the can first, followed by the barrier member and anode composition. When a compressed cylindrical anode is used, as in FIG. 6, this is inserted together with the separator. The terminal-diaphragm valve assembly, together with the insulating gasket are then inserted in a single operation. The upper lip of the can is then rolled over to retain the closure members. The can is finally drawn through a forming tool having a hole with a diameter only sufficiently great to permit the unflared portion of the can to pass freely through. As the entire can is forced through the hole, the flared portion is compressed radially inward with sufficient clamping force to provide a tight seal between the can 1, the sealing gasket 3, and the diaphragm 4. The closure structure is retained between the rolled over lip of the can and the circular groove or bead which results when the flange is drawn through the hole of the forming tool.

Alternatively, a can of uniform diameter may be utilized, a bead rolled into the can wall above the upper limit of the active elements in such a manner as to act as a lower support for the closure. The closure elements are then inserted and the rim of the can rolled thereover to provide clamping force against the gasket and diaphragm.

The fluid venting valve according to the invention operates in the following manner: Under normal conditions the diaphragm 4, which is preferably composed of a thin resilient spring metal sheet, preferably of spring steel, rests in substantially flat position and its edge is in sealing engagement with the sealing gasket 3. An air-tight or hermetic seal is thus provided. This condition is shown in detail in FIG. 4. Under conditions where a fluid pressure differential forms between the two sides of the diaphragm, as for example, when gas is generated in a voltaic cell, the resultant force against the diaphragm 4 urges it outwardly. Since the edge of the rigid cap 5 limits axial movement of the edge of the venting disc, only the central portion of the diaphragm is able to bow outwardly, as shown in FIG. 5. This results in a decrease in the effective diameter of the diaphragm, causing its edge which is not spot welded to the cap 5 to recede a short distance radially. As a result the seal between the disc and the sealing gasket 3 is weakened, and, when sufficient retraction takes place, the seal is broken and a quantity of gas is permitted to vent to the atmosphere, passing between the metal-to-metal engaging surface of diaphragm 4 and cap 5 and out through vent 6. The venting continues until the diminished pressure once again permits the sealing disc to engage the gasket and reestablish a hermetic seal.

The present invention provides a structure which permits the venting of a voltaic cell at a predetermined pressure with great precision. Moreover, because the valve, external electrode and internal contact member are preformed into an integral unit or assembly, assembly of the cell is greatly facilitated, reducing assembly costs and permitting automatic machinery to be used in mass production assembly methods.

Although the invention has been described in detail in relation to only relatively few specific embodiments, it is to be understood that many variations may be practiced by those skilled in the art without departing from the spirit or scope thereof, within the limits defined by the appended claims.

Invention is claimed as follows:

1. In a voltaic cell comprising a container including therein electrodes comprising a cathode and an anode, and cell electrolyte, the improvement which comprises an integral assembly comprising an electrically conductive outer terminal member, a disc-form diaphragm valve comprised of a resilient metal, and an electrically conductive contact member engaging said anode in electrical contact therewith, the periphery of said outer terminal member being in contact engagement with and a limited area thereof being affixed to the periphery of said diaphragm valve, the central portion of said outer terminal member being spaced apart from the central portion of said diaphragm valve to permit said diaphragm valve to bow into the space therebetween, said terminal member having an aperture therein to permit the passage of gas therethrough, said contact member having one end thereof affixed to a central portion of said diaphragm valve, a sealing gasket of an electrically non-conductive sealable material disposed in sealing engagement over the edges of both said diaphragm valve and said terminal member, the open end of said cell container being arranged for clamping said gasket radially against the edges of said diaphragm valve and said terminal member, the arrangement being such that said cell is normally in a hermetically sealed condition, and whereby gas pressure developed within said cell of a predetermined magnitude causes said diaphragm valve to bow outwardly and its free edge to recede from said gasket while said gasket is restrained in position by the edge of said terminal member, thereby breaking the seal between said diaphragm and said gasket and permitting gas to flow out of said cell until the gas pressure within the cell has again been reduced sufficiently to reestablish the seal, and whereby in constructing said cell, said assembly may be inserted as a unit thereby facilitating said construction.

2. A voltaic cell according to claim 1 wherein said diaphragm valve is comprised of spring steel.

3. A voltaic cell according to claim 1 wherein said anode comprises a slurry of electrolyte, a cellulosic material, and powdered zinc metal.

4. A voltaic cell according to claim 1 wherein said anode comprises a gel of cell electrolyte, carboxymethylcellulose, and powdered zinc metal.

5. A voltaic cell according to claim 1 wherein said anode is tubular and is comprised of compressed powdered zinc.

6. A voltaic cell according to claim 1 wherein said electrolyte is alkaline.

7. A voltaic cell according to claim 1 wherein said cathode comprises manganese dioxide.

8. A voltaic cell according to claim 1 wherein the normal diameters of said terminal member and said diaphragm valve are substantially the same.

9. A voltaic cell according to claim 1 wherein said gasket is composed of nylon.

10. A voltaic cell according to claim 1 wherein said outer terminal member, said diaphragm valve, and said contact member are affixed to each other by welding.

References Cited

UNITED STATES PATENTS

| | | | |
|---|---|---|---|
| 3,114,659 | 12/1963 | Warren | 136—178 |
| 3,143,441 | 8/1964 | Coleman et al. | 136—133 X |
| 3,219,487 | 11/1965 | Krouse et al. | 136—134 X |

WINSTON A. DOUGLAS, *Primary Examiner.*

D. L. WALTON, *Assistant Examiner.*